United States Patent [19]

Abramovitz

[11] Patent Number: 4,575,191
[45] Date of Patent: Mar. 11, 1986

[54] COMPACT BEAM SPLITTER FOR ACOUSTO-OPTIC CORRELATOR

[75] Inventor: Irwin J. Abramovitz, Baltimore, Md.

[73] Assignee: The United States of America as represented by the Secretary of the Army, Washington, D.C.

[21] Appl. No.: 525,183

[22] Filed: Aug. 22, 1983

[51] Int. Cl.⁴ .......................... G02F 1/11; G02B 27/14
[52] U.S. Cl. ...................................... 350/358; 350/173
[58] Field of Search ................................. 350/173–174, 350/286, 358, 170, 371; 455/611; 356/359–360, 169, 171, 130, 132; 353/33–34

[56] References Cited

U.S. PATENT DOCUMENTS

| 3,419,898 | 12/1968 | Baldwin et al. | 350/173 |
| 3,462,603 | 8/1969 | Gordon | 350/358 |
| 3,536,922 | 10/1970 | Ito | 455/611 |
| 3,987,299 | 10/1976 | Mulder | 350/174 |
| 4,161,349 | 7/1979 | Norman | 350/173 |
| 4,326,778 | 4/1982 | Berg et al. | 350/358 |
| 4,421,388 | 12/1983 | Berg et al. | 350/358 |

FOREIGN PATENT DOCUMENTS 2449109  5/1976  Fed. Rep. of Germany ...... 350/174

OTHER PUBLICATIONS

Kirchner, E. K. "Acousto-Optic Devices for Use in Radio Frequency Target Simulators" Proc. Soc. Phot-Opt. Instrum. Eng. (USA), 1979, SPIE vol. 202, pp. 175-179.

Primary Examiner—William H. Punter
Attorney, Agent, or Firm—Saul Elbaum; Tom McDonald; Anthony T. Lane

[57] ABSTRACT

A compact beam splitter apparatus for use with a surface wave acousto-optic time integrating correlator, including a beam splitter for splitting a laser light beam into two beams and a Koesters prism disposed in the paths of the two beams for folding a portion of each beam so that the two folded beam portions converge to a common beam position at a predetermined acute angle between the two beam portions. A single Koesters prism may be used as the beam splitter and the beam folding device, with two mirrors being used to reflect the two beams back to the Koesters prism.

11 Claims, 9 Drawing Figures

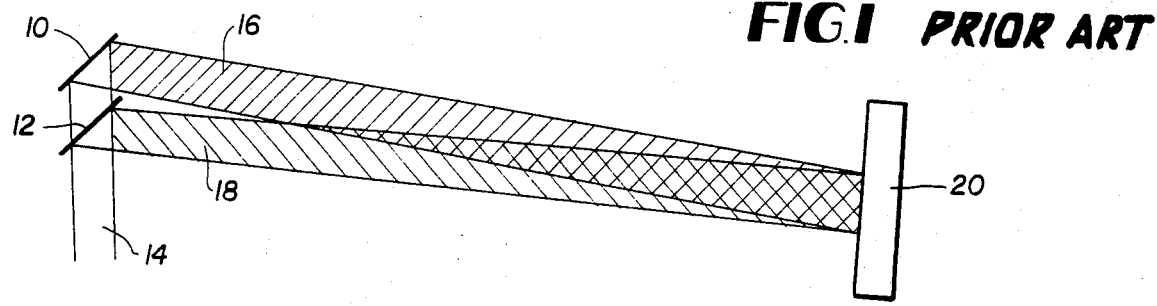
FIG. 1 PRIOR ART
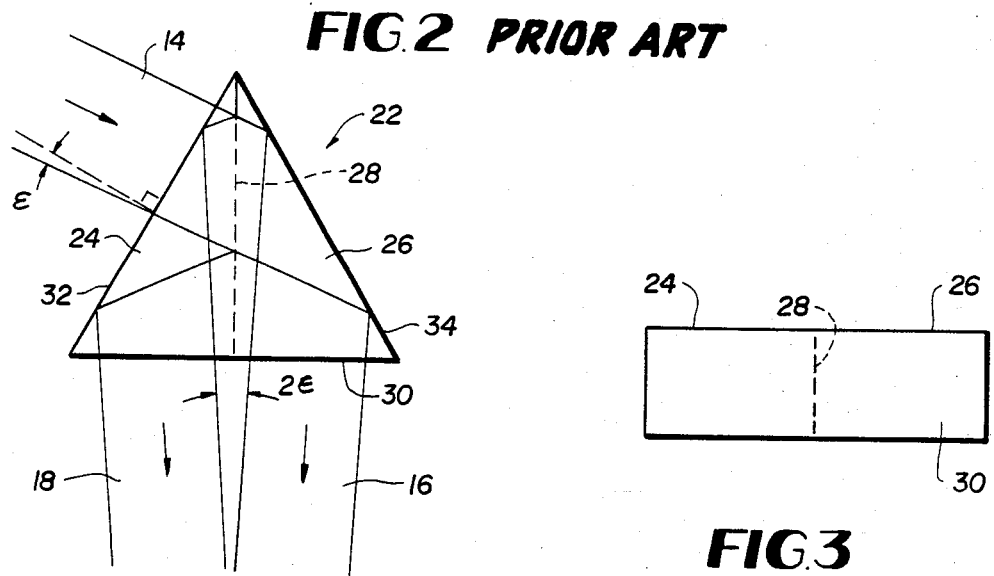
FIG. 2 PRIOR ART
FIG. 3 PRIOR ART
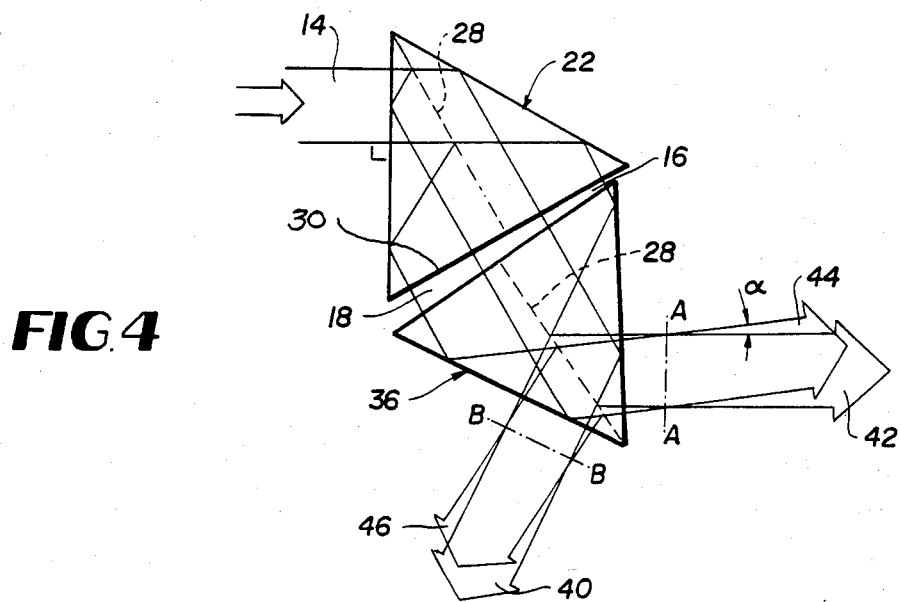
FIG. 4

FIG. 4,575,191

COMPACT BEAM SPLITTER FOR ACOUSTO-OPTIC CORRELATOR

RIGHTS OF THE GOVERNMENT

The invention described herein may be manufactured, used and licensed by or for the U.S. Government for governmental purposes without the payment to me of any royalties thereon.

BACKGROUND OF THE INVENTION

The invention relates generally to beam splitters, and in particular, to a compact beam splitter apparatus for use with a surface wave acousto-optic time integrating correlator.

In known acousto-optic time integrating correlators, such as the correlator described in U.S. Pat. No. 4,326,778, issued Apr. 27, 1982 to Berg et al, or the correlator described in the U.S. Pat. No. 4,421,388 issued Dec. 20, 1983 to Berg et al, two beams generated from a single laser converge on an acousto-optic delay line with a small angle between the two beams. In these known correlators, a beam splitter and a mirror are used to form these two converging light beams. Generally, the angle between these two light beams must be very small; consequently, a long light path length is required between the beam splitter or mirror and the acousto-optic delay line.

SUMMARY OF THE INVENTION

It is an object of the invention to provide a compact beam splitter apparatus for use with a surface wave acousto-optic time integrating correlator.

The invention includes a conventional beam splitting device for splitting a laser light beam into two beams which extend primarily in the same direction, and a Koesters prism which is disposed in the paths of the two beams so as to fold a portion of each beam such that the two folded beam portions converge at a predetermined acute angle to a common beam position. The beam splitting device may be either another Koesters prism or a combination of a mirror and a partially reflecting, partially transmitting, planar surface.

In another embodiment of the invention, a single Koesters prism and two mirrors are used both to split a laser light beam into two beams and to fold portions of the two beams so as to shorten the distance between the Koesters prism and the common beam position.

BRIEF DESCRIPTION OF THE DRAWINGS

The invention will be better understood, and further objects, features and advantages thereof will become more apparent, from the following description of preferred embodiments, taken in conjunction with the accompanying drawings in which:

FIG. 1 is a simplified schematic of a known optical subsystem for an acousto-optic time integrating correlator;

FIGS. 2 and 3 are top and front views, respectively, of a second known optical subsystem for an acousto-optic correlator;

FIG. 4 is a first embodiment of the invention showing an optical subsystem for an acousto-optic correlator utilizing two Koesters prisms;

DESCRIPTION OF PREFERRED EMBODIMENTS

Figure 5:
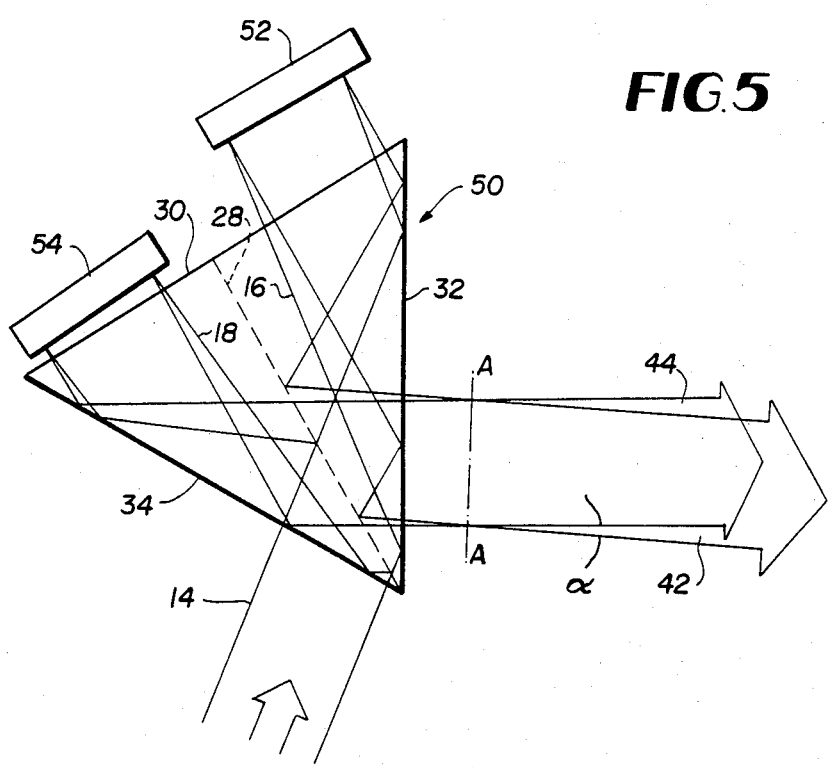
FIG. 5 is a second embodiment of the invention, showing an optical subsystem for an acousto-optic correlator which utilizes a single Koesters prism.

FIG. 1 shows a known optical subsystem for an acousto-optic correlator which includes a mirror 10 and a beam splitter 12 disposed in the path of a laser beam 14. Laser beam 14 is split into two beams 16 and 18 by the beam splitter 12. The beam 16 is reflected by the mirror 10 so that the two beams 16 and 18 converge on an acousto-optic delay line 20 with a small angle between them. For example, a path length between the mirror 10 or the beam splitter 12 and the acousto-optic delay line 20 of about 19 inches is required for one inch wide laser beams and an angle between them of about 3.6 degrees.

The mirror 10 and beam splitter 12 of the optical subassembly shown in FIG. 1 can be replaced by a single Koesters prism 22, as shown in FIG. 2. The Koesters prism 22 is composed of two identical 30°-60°-90° prisms 24, 26 which are cemented together with a beam splitting coating which forms a partially reflecting planar region 28 orthogonal to and bisecting a planar base surface 30 of the Koesters prism 22. For example, the partially reflecting planar region 28 may be a 50 percent reflecting, 50 percent transmitting, dielectric film.

The Koesters prism 22 is disposed in the path of the laser beam 14 such that the laser beam 14 impinges on one lateral surface 32 of the Koesters prism 22. The laser beam 14 deviates from a path perpendicular to the prism lateral surface 32 by a small angle $\epsilon$, shown in FIG. 2. A first beam portion 16 of the laser beam 14 passes through the planar dielectric film 28, is reflected by the other lateral surface 34 of the Koesters prism 22, and leaves the Koesters prism 22 on one side of the prism base surface 30. The remaining beam portion 18 of the laser beam 14 is first reflected by the planar dielectric film 28, and is again reflected by the prism lateral surface 32, and leaves the Koesters prism 22 on the other side of the prism base surface 30, with the angle between the two beam portions 16 and 18 being $2\epsilon$, as shown in FIG. 2.

The disposition of the Koesters prism 22 can be varied relative to the laser beam 14 so that the two beam portions 16 and 18 converge at a predetermined small angle $2\epsilon$ between them to a common position at the acousto-optic delay line 20.

In both of the optical subsystems shown in FIGS. 1 and 2, the distance between the beam splitting and directing elements 10 and 12 or 22 and the acousto-optic delay line 20 is relatively great when the angle between the two beam portions 16 and 18 is relatively small. This distance between the beam splitter elements and the acousto-optic delay line 20 can be greatly reduced, in either the embodiments of FIG. 1 or 2, by using another Koesters prism 36 disposed in the paths of the beam portions 16 and 18 so as to fold a portion of the beam 16 and a portion of the beam 18 such that the folded portions of these beams 16 and 18 converge at a predetermined acute angle between the two folded portions of the beams 16 and 18 to a common beam position.

For example, in the embodiment of the invention shown in FIG. 4, the laser beam 14 is split into two portions 16, 18 by the first Koesters prism 22, and the two beam portions 16, 18 are each split again into two further portions by the second Koesters prism 36. The laser light beam 16 is split into a portion 40 which is transmitted through the dielectric film 28 of the second Koesters prism 36, and another portion 42 which is reflected from the dielectric film 28 of the second Koesters prism 36. The laser beam 18 is split into a first laser beam portion 44 which is transmitted through the dielectric film 28 of the second Koesters prism 36, and a second laser beam portion 46 which is reflected from the dielectric film 28 of the second Koesters prism 36.

As seen in FIG. 4, the reflected portion 42 of the laser light beam 16 and the transmitted portion 44 of the laser light beam 18 intersect at a small angle $\alpha$ along a line A-A which is closely adjacent to the second Koesters prism 36, and at which an acousto-optic delay line 20 may be disposed. Thus, the distance between the first Koesters prism 22 and the acousto-optic delay line 20 has been greatly reduced from that shown for the optical subsystems of FIGS. 1 and 2.

The angle $\alpha$ between the two laser light beam portions 42, 44 can be adjusted by rotating the second Koesters prism 36 about an axis perpendicular to the laser beams 14, 16, and 18, relative to the first Koesters prism 22. Also, the line A-A at which the two laser beam portions 42 and 44 coincide can be adjusted to a desired position by translating the second Koesters prism 36 relative to the first Koesters prism 22 along the base surface 30 of the first Koesters prism 22. Also, both the angle $\alpha$ between the two laser beam portions 42, 44 and the distance of the point of cross-over of these two beams 42, 44 from the second Koesters prism 36 can be varied by varying the angle of incidence of the laser light beam 14 on the lateral surface 32 of the first Koesters prism 22.

In a similar manner, the transmitted portion 40 of the laser light beam 16 and the reflected portion 46 of the laser light beam 18 intersect at an angle $\alpha$ along a line B-B adjacent the Koesters prism 36. In effect, the laser light beam portions 40, 46 are mirror images of the laser light beam portions 42, 44, and the angle between these two light beam portions 40, 46 and their cross-over point B-B are adjusted simultaneously with the angle and cross-over point of the laser beam portions 42, 44.

The embodiment of the invention shown in FIG. 5 utilizes only one Koesters prism 50, which is functionally identical to the Koesters prisms 22 and 36 described above. The Koesters prism 50 performs the functions of both the Koesters prism 22 and the Koesters prism 36 of the embodiment shown in FIG. 4. Thus, the Koesters prism 50 is disposed in the path of the laser beam 14 so that the laser beam 14 enters the Koesters prism 50 at the lateral side 34 of the Koesters prism 50. A first portion 16 of the laser beam 14 is transmitted through the dielectric film 28, is reflected from the other lateral surface 32 of the Koesters prism 50, and is emitted from the Koesters crystal 50 through one side of the prism base surface 30. The remaining portion 18 of the laser beam 14 is reflected by the dielectric film 28, is again reflected by the prism lateral surface 34, and is emitted from the Koesters prism 50 through the other side of the prism base surface 30. The laser beam 16 and 18 are reflected back through the prism base surface 30 by two mirrors 52 and 54, respectively, so that each of these two beams 16 and 18 are further divided into two beams each, namely, 40 and 42, and 44 and 46, in the same manner as described above for the embodiment of FIG. 4. For purposes of clarity, only the portion 42 of the laser beam 16 reflected from the dielectric film 28 and the portion 44 of the laser beam 18 transmitted through the dielectric film 28 is shown in FIG. 5. The angle of the input beam 14, and the position and angles of the mirrors 52, 54 can be adjusted to obtain the desired angle $\alpha$ and cross-over position A-A.

Figure 6:
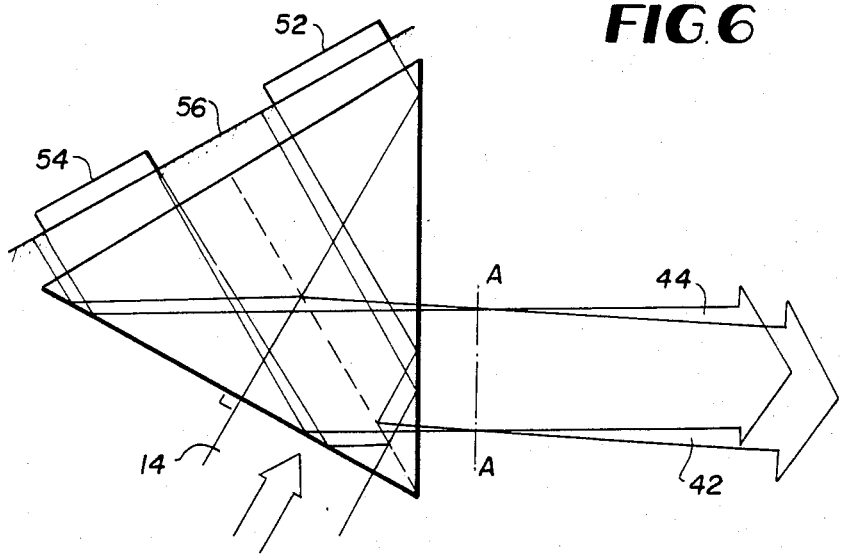
FIG. 6 shows a variation of the embodiment of the invention shown in FIG. 5.

FIG. 6 shows a modification of the embodiment of FIG. 5, in which the output laser beams 42, 44 are somewhat narrower than the input beam 14. This is accomplished by using mirrors 52, 54 which have a width less than the width of the beams 16 and 18, respectively, so that portions of these beams 16 and 18 are absorbed by the supporting structure 56 for the mirrors 52, 54.

Figure 7:
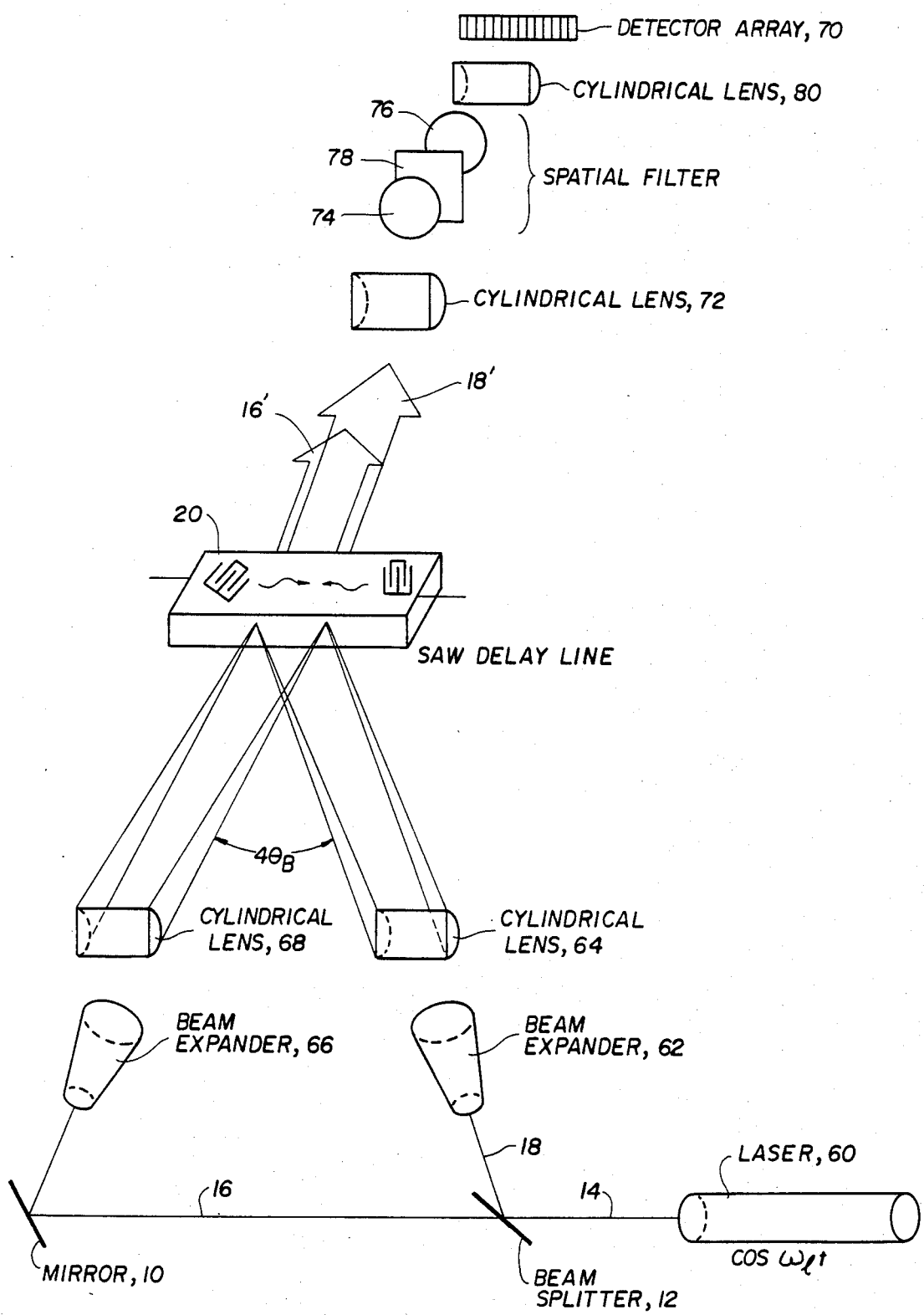
FIG. 7 is a representation in schematic form of a known acousto-optic correlator.

The acousto-optic time integrating correlator shown in FIG. 7 includes an optical subsystem similar to that shown in FIG. 1 herein, and operates in the same manner as the acousto-optic time integrating correlator described in the above referenced U.S. Pat. No. 4,326,778 to Berg et al. In the correlator of FIG. 7, a laser 60 generates the main laser beam 14, which is split into two portions 16 and 18 by the beam splitter 12. The laser beam 18 is expanded by beam expander 62, then formed as a sheet beam by a cylindrical lens 64 and directed to a surface acoustic wave (SAW) delay line 20 which is provided with two counter-propagating surface acoustic waves with wave fronts tilted with respect to each other.

The other laser light beam 16 is reflected by a mirror 10, and supplied to another beam expander 66. The expanded laser beam 16 is then formed as a sheet beam by another cylindrical lens 68, and directed to the SAW delay line 20. The two laser beams 16 and 18, in sheet form, are directed across the propagating waves of the SAW delay line 20 with an angle of $4\theta_B$ between them where $\theta_B$ is the Bragg angle, so that one beam interacts primarily with one propagating wave while the other beam interacts primarily with the other wave. The modulated optical beams 16' and 18' diffracted from beams 16 and 18 are then directed to a time integrating photodetector array 70 via a cylindrical lens 72, a spatial filter including two spherical lenses 74, 76 and a pin hole 78 intermediate the two lenses 74, 76, and another cylindrical lens 80.

Generally, the angle $4\theta_B$ between the two sheet beams 16 and 18 is very small; consequently, as discussed above, the distance between the mirror 10 or beam splitter 12 and the SAW delay line 20 is relatively very long.

Figure 8:
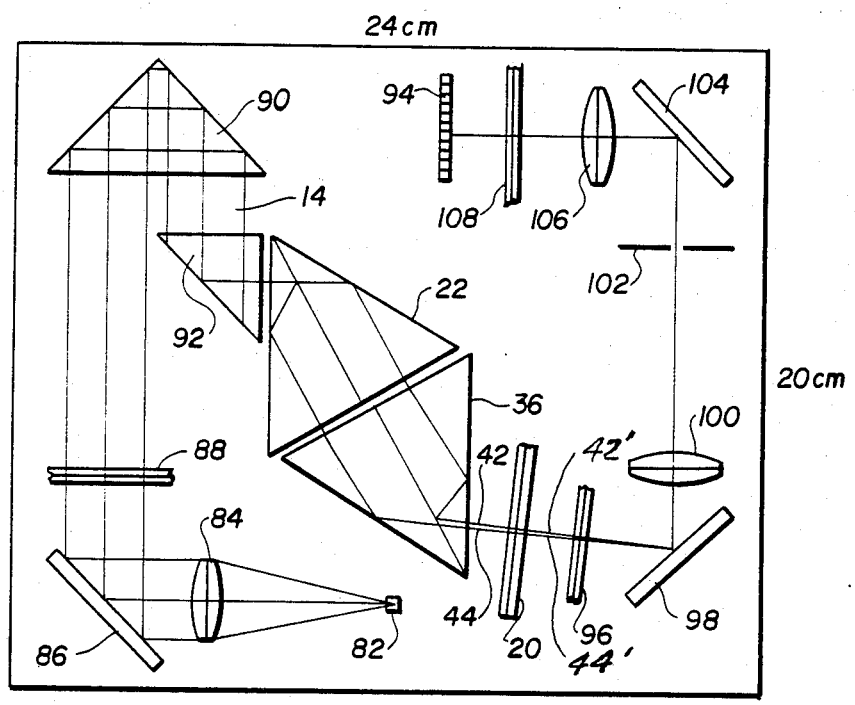
FIG. 8 is a schematic of a compact acousto-optic correlator, which utilizes the optical subsystem of FIG. 4 herein.

FIG. 8 shows a compact acousto-optic time integrating correlator, using the optical subsystem of FIG. 4. A laser diode 82 generates a laser beam 14, which is formed as a sheet beam and directed to a first Koesters prism 22 via a 60 mm focal length spherical lens 84, a mirror 86, a 250 mm focal length cylindrical lens 88, a 50 mm $\times$ 50 mm right angle prism 90, and a 35 mm $\times$ 35 mm right angle prism 92. As described earlier, the first Koesters prism 22 splits the laser beam 14 into two beam portions 16 and 18, which are directed to the second Koesters prism 36, where each of these beams 16 and 18 are split into two further beam portions. As described above, the output beams 42, 44 of the second Koesters prism 36 intersect at the SAW delay line 20, where these sheet beams 42, 44 are modulated by the first and second input signals to the SAW delay line 20, respectively. These modulated laser beams 42', 44', diffracted from laser beams 42, 44 are then supplied to a photo diode array 94 via a 22.5 mm focal length cylindrical lens 96, a mirror 98, a first 65 mm focal length spherical lens 100, a pin hole 102, another mirror 104, a second 65 mm focal length spherical lens 106, and a 22.5 mm focal length cylindrical lens 108.

Figure 9:
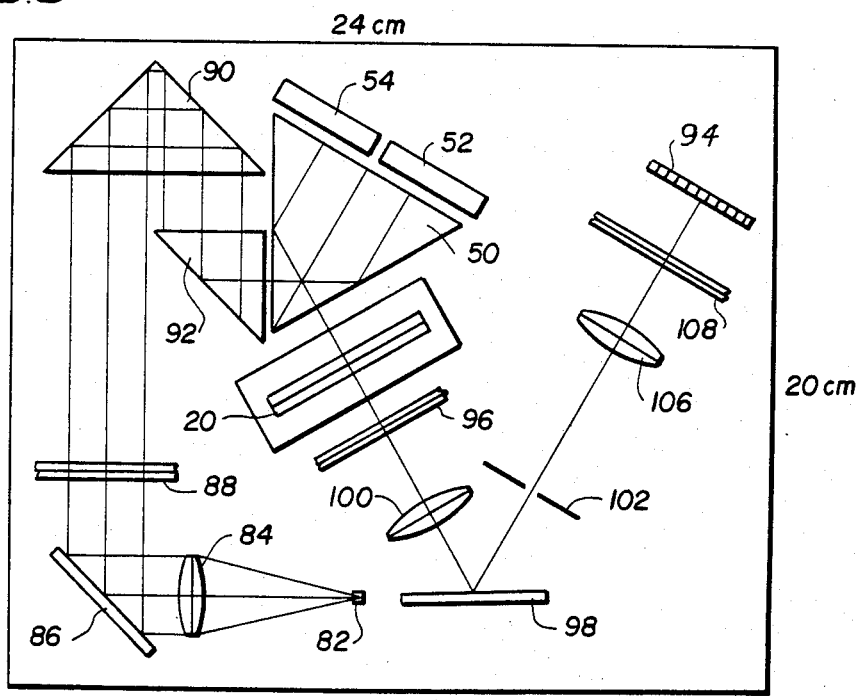
FIG. 9 is a schematic of a compact acousto-optic correlator, utilizing the optical subsystem of FIG. 5 herein.

FIG. 9 shows another compact acousto-optic time integrating correlator, similar to the known correlator of FIG. 7, which utilizes the optical subsystem of FIG. 5. This system is very similar to that of FIG. 8, except the two Koesters prisms 22 and 36 have been replaced by a single Koesters prism 50 and the two mirrors 52, 54, such as decribed in conjunction with FIG. 5.

Since various modifications, variations and additions may be made to the specific embodiments described herein, it is intended that the scope of this invention be limited only by the appended claims.

What is claimed and desired to be secured by Letters Patent of the United States is:

1. An optical apparatus which comprises:
   beam splitting means for splitting a first laser light beam into second and third beams which extend primarily in a common direction; and
   beam folding means for folding a portion of the second beam and a portion of the third beam such that the folded second and third beam portions converge at a predetermined acute angle between the second beam portion and the third beam portion to a common beam position, the beam folding means including a first Koesters prism which is disposed in the paths of the second and third beams such that the second beam enters the first Koesters prism at a planar base surface of the first Koesters prism on one side of a partially reflecting planar region of the first Koesters prism and the third beam enters the first Koesters prism at the base surface on the other side of the partially reflecting region, and such that the converging second and third beam portions leave the first Koesters prism at one of two planar lateral surfaces of the first Koesters prism.

2. An optical apparatus which comprises:
   beam splitting means for splitting a first laser light beam into second and third beams which extend primarily in a common direction, the beam splitting means comprising a first Koesters prism, which is disposed in the path of the first beam such that the first beam enters the first Koesters prism at one of the two lateral surfaces of the first Koesters prism and the second and third beams leave the first Koesters prism at the base surface thereof, on opposite sides of the partially reflecting region of the first Koesters prism; and
   beam folding means for folding a portion of the second beam and a portion of the third beam such that the folded second and third beam portions converge at a predetermined acute angle between the second beam portion and the third beam portion to a common beam position, the beam folding means including the first Koesters prism and two mirrors which are respectively disposed in the paths of the second and third beams to reflect the second and third beams back to the base surface of the first Koesters prism on opposite sides of the partially reflecting region so that the second and third beam portions leave the first Koesters prism at one of the two lateral surfaces of the first Koesters prism and converge at the common beam bath position.

3. An optical apparatus which comprises:
   beam splitting means, which comprises a first Koesters prism, for splitting a first laser light beam into second and third beams which extend primarily in a common direction; and
   beam folding means for folding a portion of the second beam and a portion of the third beam such that the folded second and third beam portions converge at a predetermined acute angle between the second beam portion and the third beam portion to a common beam position, the beam folding means including a second Koesters prism.

4. An optical apparatus, as described in claim 3, wherein the first Koesters prism is disposed in the path of the first beam such that first beam enters the first Koesters prism at one of two lateral planar surfaces of the first Koesters prism and the second and third beams leave the first Koesters prism at a planar base surface of the first Koesters prism on opposite sides of a partially reflecting planar region of the first Koesters prism.

5. An optical apparatus, as described in claim 1, which further comprises:
   an acousto-optic interaction medium, having a surface which is disposed relative to the first Koesters prism such that the common beam position of the second and third beam portions is disposed at the medium surface and the second and third beams are directed across the medium surface;
   a first acoustic transducer means disposed on the medium surface for converting a first high frequency electrical signal to a first acoustic wave and propagating the first acoustic wave along the medium surface in a first direction so that the first acoustic wave interacts primarily with the second beam portion directed across the medium surface; and
   a second acoustic transducer means disposed on the medium surface for converting a second high frequency electrical signal to a second acoustic wave and propagating the second acoustic wave along the medium surface in a second direction so that the second acoustic wave interacts primarily with the third beam portion directed across the medium surface.

6. An optical apparatus, as described in claim 5, which further comprises:
   a time integrating photodetector means; and
   means for directing the modulated light diffracted from the second and third beam portions to the photodetector means after the second and third beam portions have traversed the acousto-optic interaction medium.

7. An optical apparatus which comprises:
   beam splitting means for splitting a first laser light beam into a second beam and a third beam which extends primarily in the same direction as the second beam; and
   light path folding means for folding a portion of the second beam and a portion of the third beam so that the folded second and third beam portions converge at a predetermined acute angle between the second beam portion and the third beam portion to a common beam position at which the second beam portion and the third beam portion are essentially congruent, the light path folding means including a first Koesters prism which is disposed in the paths of the second and third beams such that the second beam enters the first Koesters prism at a planar base surface of the first Koesters prism on one side of a partially reflecting planar region of the first Koesters prism and the third beam enters the first Koesters prism at the base surface on the other side of the partially reflecting region, and such that the second and third beam portions leave the first Koesters prism at one of two planar lateral surfaces of the first Koesters prism and converge at the common beam path position.

8. An optical apparatus, as described in claim 7, wherein the beam splitting means comprises a second Koesters prism which is disposed in the path of the first beam such that the first beam enters the second Koesters prism at one of two lateral planar surfaces of the second Koesters prism and the second and third beam leave the second Koesters prism at a planar base surface of the second Koesters prism on opposite sides of a partially reflecting planar region of the second Koesters prism.

9. An optical apparatus, as described in claim 7, wherein:
the beam splitting means comprises the first Koesters prism, which is disposed in the path of the first beam such that the first beam enters the first Koesters prism at one of the two lateral surfaces of the first Koesters prism and the second and third beams leave the first Koesters prism at the base surface on opposite sides of the partially reflecting region; and
the optical apparatus further comprises two mirrors which are respectively disposed in the paths of the second and third beams to reflect the second and third beams back to the base surface of the first Koesters prism on opposite sides of the partially reflecting region.

10. An optical apparatus, as described in claim 7, which further comprises:
an acousto-optic interaction medium, having a surface which is disposed relative to the first Koesters prism so that the common beam path position of the second and third beam portions is disposed at the medium surface and so that the second and third beam portions are directed across the medium surface;
a first acoustic transducer means disposed on the medium surface at one end of the medium for converting a first high frequency electrical signal to a first acoustic wave and propagating the first acoustic wave along the medium surface in a first direction so that the first acoustic wave interacts primarily with the second beam portion directed across the medium surface; and
a second acoustic transducer means disposed on the medium surface at an opposite end of the medium for converting a second high frequency electrical signal to a second acoustic wave and propagating the second acoustic wave along the medium surface in a second direction so that the second acoustic wave interacts primarily with the third beam portion directed across the medium surface.

11. An optical apparatus, as described in claim 10, which further comprises:
a time integrating photodetector means, and
means for directing the modulated light diffracted from the second and third beam portions to the photodetector means after the second and third beam portions have traversed the acousto-optic interaction medium.

* * * * *